US009691284B2

(12) United States Patent
Morgan et al.

(10) Patent No.: US 9,691,284 B2
(45) Date of Patent: *Jun. 27, 2017

(54) METHODS AND SYSTEMS RELATED TO TIME TRIGGERED GEOFENCING

(71) Applicant: GORDON*HOWARD ASSOCIATES, INC., Littleton, CO (US)

(72) Inventors: Gerald A. Morgan, Littleton, CO (US); Stanley G. Schwarz, Indialantic, FL (US); Christopher M. Macheca, Centennial, CO (US)

(73) Assignee: Gordon*Howard Associates, Inc., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,310

(22) Filed: Jun. 7, 2016

(65) Prior Publication Data
US 2016/0284219 A1 Sep. 29, 2016

Related U.S. Application Data

(63) Continuation of application No. 14/639,528, filed on Mar. 5, 2015, now Pat. No. 9,384,665, which is a (Continued)

(51) Int. Cl.
G08G 1/123 (2006.01)
G08G 1/00 (2006.01)
(Continued)

(52) U.S. Cl.
CPC .............. G08G 1/207 (2013.01); G01S 19/01 (2013.01); H04W 4/021 (2013.01)

(58) Field of Classification Search
CPC .............................. H04W 4/021; G08G 1/207
(Continued)

(56) References Cited

U.S. PATENT DOCUMENTS 4,335,370 A  6/1982  Scalley et al.
4,592,443 A  6/1986  Simon
(Continued)

FOREIGN PATENT DOCUMENTS

EP         1557807        7/2005
KR   10-2004-0073816      8/2004
(Continued)

OTHER PUBLICATIONS

US 5,699,633, 10/1999, Roser (withdrawn)
(Continued)

Primary Examiner — Toan N Pham

(57) ABSTRACT

Time Triggered Geo-fencing. At least some of the example embodiments are systems including: a processor; a wireless interface coupled to the processor; and a memory coupled to the processor. The memory stores a program that when executed by the processor, causes the processor to receive a set of variables related to a geo-fence to be established at a predetermined time for a preset duration; establish the geo-fence at the predetermined time, the geo-fence established for the preset duration; monitor a location of a vehicle using signals received by the processor; and send an alert related to the location of the vehicle if said monitoring indicates the vehicle has crossed the geo-fence within the preset duration.

18 Claims, 7 Drawing Sheets

Related U.S. Application Data continuation of application No. 13/925,452, filed on Jun. 24, 2013, now Pat. No. 9,013,333.

(51) Int. Cl.
*H04W 4/02* (2009.01)
*G01S 19/01* (2010.01)

(58) Field of Classification Search
USPC ............ 340/990, 988, 426.1, 426.18, 426.2, 340/426.22, 426.36, 5.72, 539.13, 5.1, 340/5.2, 5.61, 541; 701/201, 202, 207, 701/213
See application file for complete search history.

(56) References Cited

U.S. PATENT DOCUMENTS

| | | | |
|---|---|---|---|
| 4,624,578 A | 11/1986 | Green | |
| 4,688,026 A | 8/1987 | Scribner et al. | |
| 4,700,296 A | 10/1987 | Palmer, Jr. et al. | |
| 4,736,294 A | 4/1988 | Gill et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,359,528 A | 10/1994 | Haendel et al. | |
| 5,426,415 A | 6/1995 | Prachar et al. | |
| 5,490,200 A | 2/1996 | Snyder et al. | |
| 5,495,531 A | 2/1996 | Smiedt | |
| 5,510,780 A | 4/1996 | Norris et al. | |
| 5,619,573 A | 4/1997 | Brinkmeyer et al. | |
| 5,673,318 A | 9/1997 | Bellare et al. | |
| 5,708,712 A | 1/1998 | Brinkmeyer et al. | |
| 5,775,290 A | 7/1998 | Staerzi et al. | |
| 5,797,134 A | 8/1998 | McMillan et al. | |
| 5,818,725 A | 10/1998 | McNamara et al. | |
| 5,819,869 A | 10/1998 | Horton | |
| 5,857,024 A | 1/1999 | Nishino | |
| 5,898,391 A | 4/1999 | Jefferies et al. | |
| 5,917,405 A | 6/1999 | Joao | |
| 5,928,291 A | 7/1999 | Jenkins et al. | |
| 5,940,812 A | 8/1999 | Tengel et al. | |
| 5,969,633 A | 10/1999 | Rosler | |
| 5,970,143 A | 10/1999 | Schneier et al. | |
| 5,970,481 A | 10/1999 | Westerlage | |
| 6,025,774 A | 2/2000 | Forbes | |
| 6,026,922 A | 2/2000 | Horton | |
| 6,032,258 A | 2/2000 | Godoroja et al. | |
| 6,064,970 A | 5/2000 | McMillan et al. | |
| 6,088,143 A | 7/2000 | Bang | |
| 6,130,621 A | 10/2000 | Weiss | |
| 6,157,317 A | 12/2000 | Walker | |
| 6,185,307 B1 | 2/2001 | Johnson, Jr. | |
| 6,195,648 B1 | 2/2001 | Simon et al. | |
| 6,225,890 B1 | 5/2001 | Murphy | |
| 6,232,874 B1 | 5/2001 | Murphy | |
| 6,233,566 B1 | 5/2001 | Levine et al. | |
| 6,249,217 B1 | 6/2001 | Forbes | |
| 6,249,227 B1 | 6/2001 | Brady et al. | |
| 6,278,936 B1 | 8/2001 | Jones | |
| 6,353,776 B1 | 3/2002 | Rohrl et al. | |
| 6,370,649 B1 | 4/2002 | Angelo et al. | |
| 6,380,848 B1 | 4/2002 | Weigl et al. | |
| 6,401,204 B1 | 6/2002 | Euchner et al. | |
| 6,429,773 B1 | 8/2002 | Schuyler | |
| 6,489,897 B2 | 12/2002 | Simon | |
| 6,587,739 B1 | 7/2003 | Abrams et al. | |
| 6,601,175 B1 | 7/2003 | Arnold et al. | |
| 6,611,201 B1 | 8/2003 | Bishop et al. | |
| 6,611,686 B1 | 8/2003 | Smith et al. | |
| 6,615,186 B1 | 9/2003 | Kolls | |
| 6,665,613 B2 | 12/2003 | Duvall | |
| 6,693,517 B2 | 2/2004 | McCarthy et al. | |
| 6,714,859 B2 | 3/2004 | Jones | |
| 6,717,527 B2 | 4/2004 | Simon | |
| 6,741,927 B2 | 5/2004 | Jones | |
| 6,804,606 B2 | 10/2004 | Jones | |
| 6,812,829 B1 | 11/2004 | Flick | |
| 6,816,089 B2 | 11/2004 | Flick | |
| 6,816,090 B2 | 11/2004 | Teckchandani et al. | |
| 6,828,692 B2 | 12/2004 | Simon | |
| 6,868,386 B1 | 3/2005 | Henderson et al. | |
| 6,870,467 B2 | 3/2005 | Simon | |
| 6,873,824 B2 | 3/2005 | Flick | |
| 6,888,495 B2 | 5/2005 | Flick | |
| 6,917,853 B2 | 7/2005 | Chirnomas | |
| 6,924,750 B2 | 8/2005 | Flick | |
| 6,950,807 B2 | 9/2005 | Brock | |
| 6,952,645 B1 | 10/2005 | Jones | |
| 6,961,001 B1 | 11/2005 | Chang et al. | |
| 6,972,667 B2 | 12/2005 | Flick | |
| 6,985,583 B1 | 1/2006 | Brainard et al. | |
| 6,993,658 B1 | 1/2006 | Engberg et al. | |
| 7,005,960 B2 | 2/2006 | Flick | |
| 7,015,830 B2 | 3/2006 | Flick | |
| 7,020,798 B2 | 3/2006 | Meng et al. | |
| 7,031,826 B2 | 4/2006 | Flick | |
| 7,031,835 B2 | 4/2006 | Flick | |
| 7,039,811 B2 | 5/2006 | Ito | |
| 7,053,823 B2 | 5/2006 | Cervinka et al. | |
| 7,061,137 B2 | 6/2006 | Flick | |
| 7,091,822 B2 | 8/2006 | Flick et al. | |
| 7,103,368 B2 | 9/2006 | Teshima | |
| 7,123,128 B2 | 10/2006 | Mullet et al. | |
| 7,124,088 B2 | 10/2006 | Bauer et al. | |
| 7,133,685 B2 | 11/2006 | Hose et al. | |
| 7,142,089 B2 | 11/2006 | Yamagishi | |
| 7,149,623 B2 | 12/2006 | Flick | |
| 7,205,679 B2 | 4/2007 | Flick | |
| 7,224,083 B2 | 5/2007 | Flick | |
| 7,228,417 B2 | 6/2007 | Roskind | |
| 7,266,507 B2 | 9/2007 | Simon et al. | |
| 7,292,152 B2 | 11/2007 | Torkkola et al. | |
| 7,299,890 B2 | 11/2007 | Mobley | |
| 7,310,618 B2 | 12/2007 | Libman | |
| 7,323,982 B2 | 1/2008 | Staton et al. | |
| 7,327,250 B2 | 2/2008 | Harvey | |
| 7,379,805 B2 | 5/2008 | Olsen, III et al. | |
| 7,389,916 B2 | 6/2008 | Chirnomas | |
| 7,427,924 B2 | 9/2008 | Ferrone et al. | |
| 7,542,921 B1 | 6/2009 | Hildreth | |
| 7,561,102 B2 | 7/2009 | Duvall | |
| 7,814,005 B2 | 10/2010 | Imrey et al. | |
| 7,818,254 B1 | 10/2010 | Ma | |
| 7,823,681 B2 | 11/2010 | Crespo et al. | |
| 7,873,455 B2 | 1/2011 | Arshad et al. | |
| 7,877,269 B2 | 1/2011 | Bauer et al. | |
| 7,904,332 B1 | 3/2011 | Merkley | |
| 7,930,211 B2 | 4/2011 | Crolley | |
| 8,018,329 B2 | 9/2011 | Morgan et al. | |
| 8,086,523 B1 | 12/2011 | Palmer | |
| 8,095,394 B2 | 1/2012 | Nowak et al. | |
| 8,140,358 B1 | 3/2012 | Ling et al. | |
| 8,217,772 B2 | 7/2012 | Morgan et al. | |
| 8,325,025 B2 | 12/2012 | Morgan et al. | |
| 8,344,894 B2 | 1/2013 | Szczerba et al. | |
| 8,370,027 B2 | 2/2013 | Pettersson et al. | |
| 8,370,925 B2 | 2/2013 | Childress et al. | |
| 8,510,556 B2 | 8/2013 | Cao et al. | |
| 8,630,768 B2 | 1/2014 | McClellan et al. | |
| 8,653,956 B2 | 2/2014 | Berkobin et al. | |
| 8,754,751 B1 | 6/2014 | Picolli | |
| 8,841,987 B1 | 9/2014 | Stanfield et al. | |
| 9,002,536 B2 | 4/2015 | Hatton | |
| 9,013,333 B2 * | 4/2015 | Morgan | ................ G08G 1/207 340/539.13 |
| 9,384,665 B2 * | 7/2016 | Morgan | ................ G08G 1/207 |
| 2001/0034577 A1 | 10/2001 | Grounds et al. | |
| 2001/0040503 A1 | 11/2001 | Bishop | |
| 2002/0019055 A1 | 2/2002 | Brown | |
| 2002/0091473 A1 | 7/2002 | Gardner et al. | |
| 2002/0120371 A1 | 8/2002 | Levian et al. | |
| 2002/0120374 A1 | 8/2002 | Douros | |

(56) References Cited

U.S. PATENT DOCUMENTS

| | | |
|---|---|---|
| 2002/0193926 A1 | 12/2002 | Katagishi et al. |
| 2003/0036823 A1 | 2/2003 | Mahvi |
| 2003/0095046 A1 | 5/2003 | Borugian |
| 2003/0101120 A1 | 5/2003 | Tilton |
| 2003/0151501 A1 | 8/2003 | Teckchandani et al. |
| 2003/0191583 A1 | 10/2003 | Uhlmann et al. |
| 2003/0231550 A1 | 12/2003 | McFarlane |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0024203 A1 | 2/2005 | Wolfe |
| 2005/0030184 A1 | 2/2005 | Victor |
| 2005/0033483 A1 | 2/2005 | Simon et al. |
| 2005/0128080 A1 | 6/2005 | Hall et al. |
| 2005/0134438 A1 | 6/2005 | Simon |
| 2005/0162016 A1 | 7/2005 | Simon |
| 2005/0200453 A1 | 9/2005 | Turner et al. |
| 2005/0231323 A1 | 10/2005 | Underdahl et al. |
| 2005/0270178 A1 | 12/2005 | Ioli |
| 2006/0028431 A1 | 2/2006 | Leong |
| 2006/0059109 A1 | 3/2006 | Grimes |
| 2006/0080599 A1 | 4/2006 | Dubinsky |
| 2006/0100944 A1 | 5/2006 | Reddin et al. |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0021100 A1 | 1/2007 | Haave et al. |
| 2007/0038351 A1 | 2/2007 | Larschan et al. |
| 2007/0082614 A1 | 4/2007 | Mock |
| 2007/0139189 A1 | 6/2007 | Helmig |
| 2007/0146146 A1 | 6/2007 | Kopf et al. |
| 2007/0176771 A1 | 8/2007 | Doyle |
| 2007/0179692 A1 | 8/2007 | Smith et al. |
| 2007/0185728 A1 | 8/2007 | Schwarz et al. |
| 2007/0194881 A1 | 8/2007 | Schwarz et al. |
| 2007/0222588 A1 | 9/2007 | Wolfe |
| 2007/0224939 A1 | 9/2007 | Jung et al. |
| 2007/0285207 A1 | 12/2007 | Bates |
| 2007/0288271 A1 | 12/2007 | Klinkhammer |
| 2007/0299567 A1 | 12/2007 | Simon et al. |
| 2008/0042814 A1 | 2/2008 | Hurwitz et al. |
| 2008/0109378 A1 | 5/2008 | Papadimitriou |
| 2008/0114541 A1 | 5/2008 | Shintani et al. |
| 2008/0150683 A1 | 6/2008 | Mikan et al. |
| 2008/0162034 A1 | 7/2008 | Breen |
| 2008/0221743 A1 | 9/2008 | Schwarz et al. |
| 2008/0223646 A1 | 9/2008 | White |
| 2008/0231446 A1 | 9/2008 | Cresto |
| 2008/0243558 A1 | 10/2008 | Gupte |
| 2008/0245598 A1 | 10/2008 | Gratz et al. |
| 2008/0255722 A1 | 10/2008 | McClellan et al. |
| 2008/0294302 A1 | 11/2008 | Basir |
| 2009/0043409 A1 | 2/2009 | Ota |
| 2009/0051510 A1 | 2/2009 | Follmer et al. |
| 2009/0182216 A1 | 7/2009 | Roushey, III et al. |
| 2009/0234770 A1 | 9/2009 | Simon |
| 2009/0237249 A1 | 9/2009 | Bielas |
| 2009/0248222 A1 | 10/2009 | McGarry et al. |
| 2009/0284359 A1 | 11/2009 | Huang et al. |
| 2009/0284367 A1 | 11/2009 | Pfafman et al. |
| 2009/0295537 A1 | 12/2009 | Lane et al. |
| 2010/0030586 A1 | 2/2010 | Taylor et al. |
| 2010/0045452 A1 | 2/2010 | Periwal |
| 2010/0063850 A1 | 3/2010 | Daniel |
| 2010/0075655 A1 | 3/2010 | Howarter et al. |
| 2010/0090826 A1 | 4/2010 | Moran et al. |
| 2010/0148947 A1 | 6/2010 | Morgan et al. |
| 2010/0238009 A1 | 9/2010 | Cook et al. |
| 2010/0268402 A1 | 10/2010 | Schwarz et al. |
| 2010/0312691 A1 | 12/2010 | Johnson, Jr. |
| 2011/0040630 A1 | 2/2011 | Weiss |
| 2011/0050407 A1 | 3/2011 | Schoenfeld et al. |
| 2011/0057800 A1 | 3/2011 | Sofer |
| 2011/0084820 A1 | 4/2011 | Walter et al. |
| 2011/0148626 A1 | 6/2011 | Acevedo |
| 2011/0153143 A1 | 6/2011 | O'Neil et al. |
| 2011/0210867 A1 | 9/2011 | Benedikt |
| 2011/0270779 A1 | 11/2011 | Showalter |
| 2012/0066011 A1 | 3/2012 | Ichien et al. |
| 2012/0068858 A1 | 3/2012 | Fredkin |
| 2012/0068886 A1 | 3/2012 | Torres |
| 2012/0089423 A1 | 4/2012 | Tamir et al. |
| 2012/0098678 A1 | 4/2012 | Rathmacher et al. |
| 2012/0158356 A1 | 6/2012 | Prochaska et al. |
| 2012/0203441 A1 | 8/2012 | Higgins et al. |
| 2012/0212353 A1 | 8/2012 | Fung et al. |
| 2012/0221216 A1 | 8/2012 | Chauncey et al. |
| 2013/0018677 A1 | 1/2013 | Chevrette |
| 2013/0074107 A1 | 3/2013 | Hyde et al. |
| 2013/0074111 A1 | 3/2013 | Hyde et al. |
| 2013/0074112 A1 | 3/2013 | Hyde et al. |
| 2013/0074115 A1 | 3/2013 | Hyde et al. |
| 2013/0099892 A1 | 4/2013 | Tucker et al. |
| 2013/0127617 A1 | 5/2013 | Baade et al. |
| 2013/0138460 A1 | 5/2013 | Schumann et al. |
| 2013/0141252 A1 | 6/2013 | Ricci |
| 2013/0144460 A1 | 6/2013 | Ricci |
| 2013/0144461 A1 | 6/2013 | Ricci |
| 2013/0144469 A1 | 6/2013 | Ricci |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0204455 A1 | 8/2013 | Chia et al. |
| 2013/0338914 A1 | 12/2013 | Weiss |
| 2014/0191858 A1 | 7/2014 | Morgan et al. |
| 2014/0225724 A1 | 8/2014 | Rankin et al. |
| 2014/0358896 A1 | 12/2014 | Camacho et al. |
| 2016/0090923 A1 | 3/2016 | Al Salah |

FOREIGN PATENT DOCUMENTS

| | | |
|---|---|---|
| WO | 9616845 | 6/1996 |
| WO | 2007092272 | 8/2007 |
| WO | 2007092287 | 8/2007 |
| WO | 2010/068438 A2 | 6/2010 |
| WO | 2010062899 | 6/2010 |
| WO | 2012/097441 A1 | 7/2012 |

OTHER PUBLICATIONS

On Time Payment Protection Systems, printed Jan. 2, 2004 from www.ontime-pps.com/how.html, 2 pages.

Aircept Products, printed Jan. 2, 2004 from www. aircept. com/products.html, 1 page.

How PayTeck Works, printed Jan. 2, 2004 from www. payteck.cc/aboutpayteck.html, 1 page.

Article: "Pager Lets You Locate Your Car, Unlock and Start It", published Dec. 10, 1997 in USA Today, 1 page.

Article: "Electronic Keys Keep Tabs on Late Payers", published Sep. 22, 1997 in Nonprime Auto News, 1 page.

Article: "PASSTEC Device Safely Prevents Vehicles from Starting", published Jul. 19, 1999 in Used Car News, 1 page.

Payment Clock Disabler advertisement, published, May 18, 1998, 1 page.

Secure Your Credit & Secure Your Investment (Pay Teck advertisement), printed Jan. 2, 2004 from www. payteck.cc, 1 page.

iMetrik Company Information, printed Dec. 21, 2006 from imetrik.com, 1 page.

About C-CHIP Technologies, printed Dec. 21, 2006 from www.c-chip.com, 1 page.

HI-Tech tools to solve traditional problems, printed Dec. 21, 2006 from www.c-chip.com, 1 page.

C-CHIP Technologies Products: Credit Chip 100, Credit Chip 100C, Credit Chip 200, printed Dec. 21, 2006 from www. c-chip.com, 1 page.

(56) References Cited

OTHER PUBLICATIONS

The Credit Chip 100, printed Dec. 21, 2006 from www.c-chip.com.
EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.
Fogerson, R. et al. "Qualitative Detection of Opiates in Sweat by EIA and GC-MS". Journal of Analytical Toxicology. Oct. 6, 1997, vol. 21, No. 6, pp. 451-458(8) (Abstract).
De La Torre, R. et al. "Usefulness of Sweat Testing for the Detection of Cannabis Smoke." 2004 American Association for Clinical Chemistry, Inc. 29th Arnold O. Beckman Conference. Apr. 12-13, 2011, San Diego, CA.

\* cited by examiner

US 9,691,284 B2

METHODS AND SYSTEMS RELATED TO TIME TRIGGERED GEOFENCING

CROSS-REFERENCE TO RELATED APPLICATIONS

This application is a continuation of U.S. application Ser. No. 14/639,528, titled "Methods and Systems Related to Time Triggered Geofencing", filed Mar. 5, 2015 (now U.S. Pat. No. 9,384,665) which claims priority to U.S. application Ser. No. 13/925,452 titled "Methods and Systems Related to Time Triggered Geofencing," filed Jun. 24, 2013 (now U.S. Pat. No. 9,013,333), which is incorporated herein by reference as if reproduced in full below.

BACKGROUND

A third party having an interest in the location of a vehicle, but not being the driver of the vehicle, may desire the ability to obtain information about the location of the vehicle in a variety of contexts. Thus, any developments which makes determining the location of vehicle at a specific time will be advantageous in the marketplace.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Geo-fence" shall mean a virtual perimeter enclosing a geographic area.

"Restricted area" shall mean a predetermined geographic area where a vehicle does not have permission to enter during a preset duration.

"Allowed area" shall mean a predetermined geographic area where a vehicle is allowed to enter during a preset duration.

"Remote" shall mean one kilometer or more.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of establishing a geo-fence and monitoring the movement of a vehicle in relation to the geo-fence. In particular, a geo-fence is established at a specific predetermined time and remains established for a predetermined duration. During the time the geo-fence is established, the movement of a vehicle with respect to the established geo-fence is monitored, and alerts are sent to relevant third parties. The specification first turns to a high level system overview.

Figure 1:
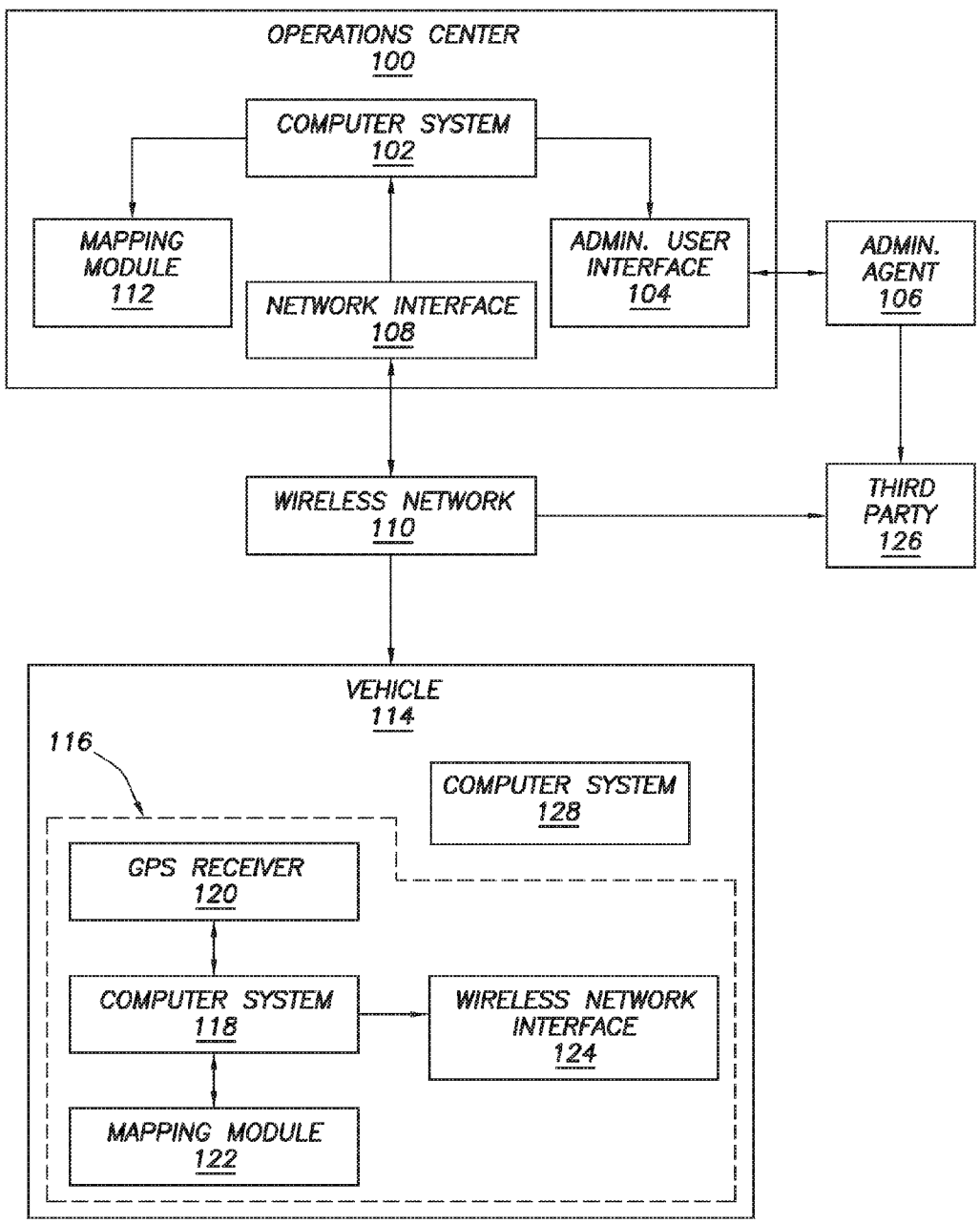
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 114 by way of a wireless network 110. The operations center 100 comprises a computer system 102. In some embodiments, the computer system 102 may be a stand-alone computer system, or may be a plurality of computer systems communicatively coupled and performing the functions of the operations center 100, the functions discussed more thoroughly below. The computer system 102 may couple to an administrative user interface 104. The administrative user interface 104 may enable an administrative agent 106 to control or configure the operation of the system.

In one embodiment, in order to communicate with vehicle 114, the operations center 100 may further comprise a network interface 108 communicatively coupled to the computer system 102. By way of the network interface 108, the computer system 102, and any programs executing thereon, may communicate with vehicle 114, such as by wireless network 110. Wireless network 110 is illustrative of any suitable communications network, such as a cellular network, a Wireless Fidelity (Wi-Fi) network, or other mechanism for transmitting information between the operations center 100 and the vehicle 114.

In accordance with at least some embodiments, the operations center 100 is remotely located from the vehicle 114. In some cases, the operations center 100 and vehicle 114 may be located within the same city or state. In other cases, the operations center 100 may be many hundreds or thousands of miles from vehicle 114, and thus the illustrative wireless network 110 may span several different types of communication networks.

Still referring to FIG. 1, the system further comprises a vehicle 114 communicatively coupled to operations center 100 by way of the illustrative wireless network 110. The vehicle 114 may comprise an onboard device 116 (shown within the dashed line). In some embodiments, the onboard device may be part of the vehicle 114 as purchased from the manufacturer (i.e., an original equipment manufacturer (OEM) device). In other embodiments, however, the onboard device 116 may be part of a third-party after-market system.

Onboard device 116 may comprise a computer system 118. Although not specifically shown, computer system 118 may comprise a processor, where the processor may communicate with subsystems of the vehicle, such as a computer system 128 of the vehicle 114. In one example embodiment, onboard device 116 may be configured to couple by way of a connector (not specifically shown) to the onboard diagnostic two (OBD-II) port to read or determine data associated with the vehicle 114.

Onboard device 116 may further comprise a wireless network interface 124 coupled to the computer system 118. By way of the wireless network interface 112, programs executed by the computer system 118 may communicate with other devices. In some embodiments, the wireless network interface 124 enables the computer system 118 to communicate with operations center 100 by way of a wireless transmission through the wireless network 110. The wireless network interface 124 thus implements a wireless communication system and/or protocol.

The onboard device 116 further comprises a global position system (GPS) receiver 120 coupled to computer system 118. The GPS receiver 120 receives signals from an array of GPS satellites orbiting the earth, and based on timing associated with arrival of those signals, a location of the onboard device 116 (and thus the vehicle 114) can be determined. In some cases, the GPS receiver 120 has sufficient functionality to calculate location, and thus the data passed to computer system 118 may be a direct indication of location. In other cases, the functionality to determine location may be shared between the GPS receiver 120 and software executing on the computer system 102, by way of wireless network 110. That is, the GPS receiver 120 may receive the plurality of GPS signals and pass the information to a program on the computer system 102, which program may then make the determination as to location of the onboard device 116, and thus the vehicle 114. In still other cases, software executing on computer system 118 combined with information received by the GPS receiver 120 may make a determination as to the location of the onboard device 116.

In one embodiment the onboard device 116 tracks the vehicle with high precision using the GPS receiver 120, and may be able to identify the street and block at which the vehicle is located at any given time (though the onboard device 116 may not necessarily have or contain street level databases). In another embodiment, location tracking may be accomplished by way of cellular signal triangulation. For example, the wireless network interface 124 may be a cellular transceiver implementing a wireless communication system and/or protocol (i.e., radio frequency communication by way of electromagnetic waves propagating through air).

In some cases, the location determined by the onboard device 116 may only be a position on the face of the earth, for example, latitude and longitude. The mapping module 112, located at the operations center 100 and receiving a stream of locations from the onboard device 116, may correlate to streets and addresses. In other cases, the onboard device 116 may have sufficient memory and computing functionality to not only determine position in a latitude and longitude sense, but also to correlate the positions to cities, streets, block numbers and addresses. Thus, the onboard device 116 coupled to vehicle 114 may further comprise its own mapping module 122 coupled to computer system 118. In accordance with at least some embodiments, the mapping module 122 may be a computer program or program package that operates or executes on the computer system 118 to perform a mapping function associated with the location of vehicle 114 and any geo-fences which may be established by the onboard device 116.

The specification next turns to a discussion of establishing a geo-fence. A geo-fence boundary which encompasses or encircles a predetermined area is automatically established by a computer system at repeating intervals. For example, the geo-fence may automatically establish at the following example intervals: every day; every week day; every weekend day; every third day, or every work day. Although these intervals have been given as example, any contemplated interval is possible. The computer system may be a remote system, such as at operations center 100, or the computer system may be located within vehicle 114, such as computer system 118. In accordance with example system, establishing is without, at the time of establishment, any input from an administrator, vehicle owner, parent, police officer, or other interested third party. Both before and during the time period in which the geo-fence is established, the computer system monitors the location of the vehicle with respect to the geo-fence.

The determination of the vehicle's location in reference to the geo-fence may be made at any suitable location in the system. For example, the onboard computer system 118 (in combination with GPS receiver 120) may make the determination locally at the vehicle 114, without any input from the operations center. In other cases, the computer system 118 reads location data and sends the location data to the operations center 100, and the operations center 100 makes the determination as to the location of the vehicle relative to the geo-fence. For example, mapping module 112 may be responsible for receiving location information. If the vehicle 116 crosses into or out of the area bounded by the geo-fence, the mapping module 112 may inform the computer system 102. Likewise, the system may determine whether the vehicle is located within the area to be bounded by the geo-fence at the time the geo-fence is established.

Depending on the situation, an alert may be sent from the vehicle to an interested third party which relays information related to the location of the vehicle in reference to a durational geo-fence. In one embodiment, the alert may be sent from the onboard device to the operations center. In another embodiment, the alert may be sent from the onboard device directly to the third party. In yet another embodiment, the onboard device may send an alert to the operations center, and then the operations center will subsequently send an alert to the third party. The third party may be the owner of vehicle 114, the parent of a child who is in control of vehicle 114, a police officer, a parole officer, or another interested third party. Whether an alert is sent, and what the alert indicates, varies from situation to situation, and will be described in more detail below with respect to example scenarios.

The specification thus turns to a variety of different scenarios. Table 1 shows a variety of possible scenarios related to establishing the geo-fence, determining the location of the vehicle, and sending an alert. Each scenario will be described in more detail below.

TABLE 1

|  | Scenario # | | | | |
| --- | --- | --- | --- | --- | --- |
|  | 1 | 2 | 3 | 4 | 5 |
| Geo-fence established first? | Yes | No | Yes | Yes | No |
| Vehicle within predetermined area at time of establishing | No | Yes | No | No | Yes |
| Vehicle enters geo-fence after establishing? | Yes | No | No | Yes | No |
| Vehicle leaves geo-fence while established? | Yes/No | Yes | No | No | No |
| Send Alert? | Yes | Yes | Yes | Yes | No |

Scenario 1—Restricted Area

Figure 2A:
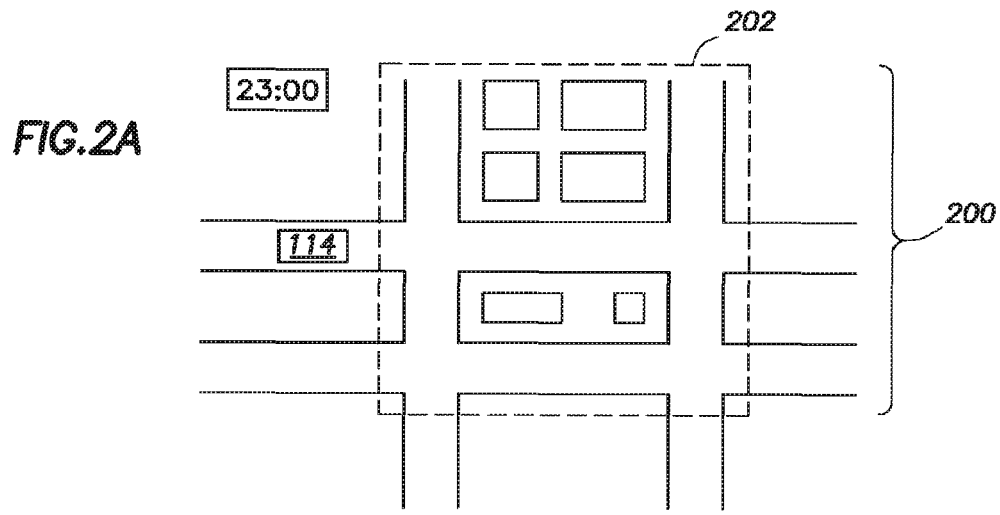
FIG. 2A shows an overhead view of an established geo-fence in accordance with at least some embodiments.
Figure 2B:
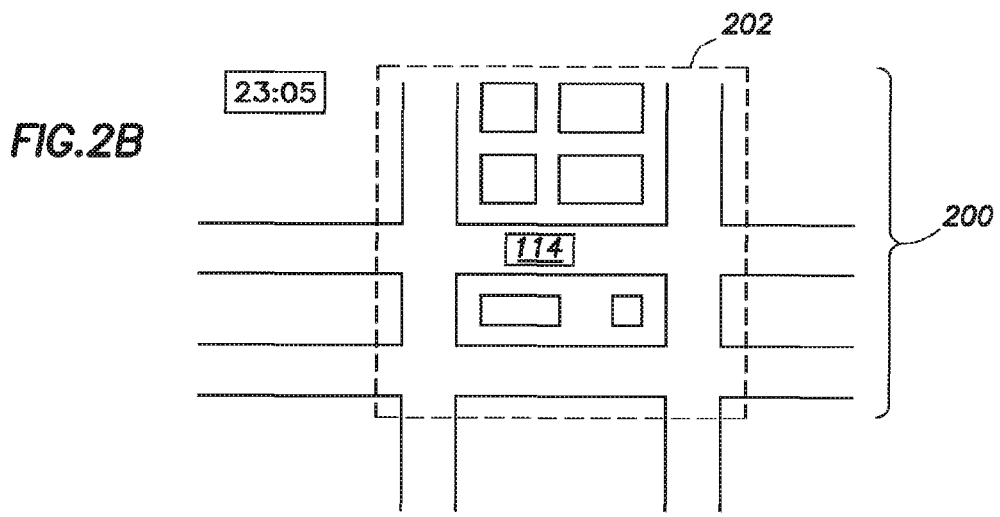
FIG. 2B shows an overhead view of an established geo-fence in accordance with at least some embodiments.
Figure 2C:
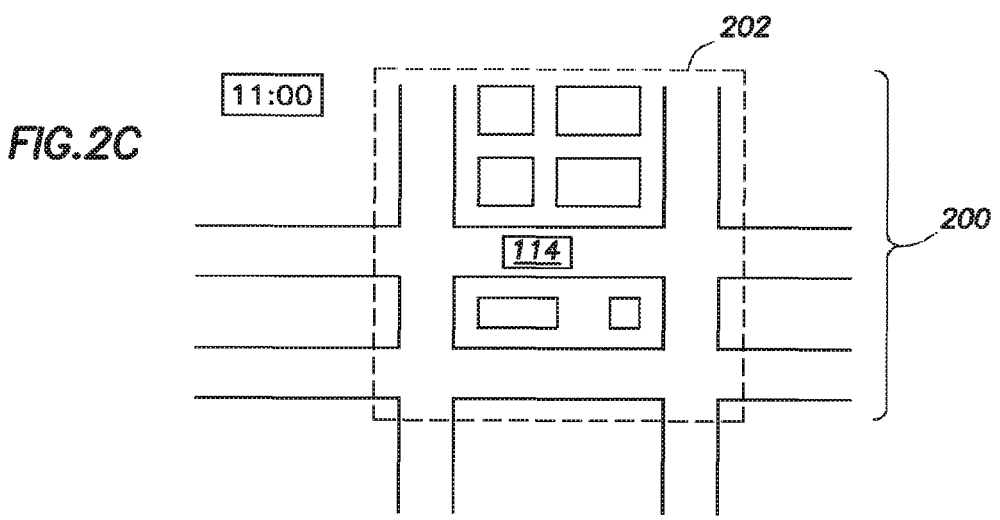
FIG. 2C shows an overhead view of a predetermined area with no geo-fence established in accordance with at least some embodiments.

With respect to Scenario 1, consider FIGS. 2A-2C. FIG. 2A shows an overhead view of a portion of a city neighborhood 200. In particular, neighborhood 200 may represent the downtown area of city. In this example scenario, a parent may want to prevent his child from driving into the downtown neighborhood 200 within a certain set of hours, such as from 11:00 p.m. until 6:00 a.m. As a result, the parent has previously defined a geo-fence around a "restricted area" of neighborhood 200 which geo-fence will automatically establish from the hours of 11:00 p.m. until 6:00 a.m. on a nightly basis.

Thus, at 11:00 p.m., geo-fence 202 is automatically established around the restricted area of neighborhood 200. The geo-fence will remain established until 6:00 a.m. If, at any time, between 11:00 p.m. and 6:00 a.m. vehicle 114 crosses geo-fence 202, an alert will be sent to the parent. In one embodiment, the geo-fence may be automatically established by the operations center; however, in another embodiment, the geo-fence may be automatically established locally at the vehicle (e.g., by computer system 118 or computer system 128).

In FIG. 2B, geo-fence 202 has been established and at 11:05 p.m. vehicle 114 is located within the restricted area bounded by geo-fence 202. In this scenario, vehicle 114 should not be located within the restricted area bounded by geo-fence 202 at this time (i.e., the hours between 11:00 p.m. and 6:00 a.m.). Thus, an alert will be sent (e.g., to the parent) indicating the vehicle has crossed into the restricted area during the restricted time period.

In contrast, however, the downtown area may not always be a "restricted area"; during "allowed hours" (e.g. 6:01 a.m. to 10:59 p.m.), in the example the teenager may be free to drive anywhere downtown without his parents being alerted (at least with respect to his location). For example, FIG. 2C shows vehicle 114 located within neighborhood 200 at 11:00 a.m. Because 11:00 a.m. does not fall within the example preset duration, geo-fence 202 is not established. As a result, vehicle 114 may be driven within neighborhood 200 and no alert will be sent to the parents.

Although the specification has discussed the specific example of parents being alerted if a teenager drives into a "restricted area" during a restricted time frame, the method described above is not limited to the teenager/downtown example. Rather, any scenario in which a geo-fence is established at a predetermined time, for a preset duration, and around a predetermined area, and for which a third party is alerted if a vehicle crosses into the established geo-fence may be contemplated.

Scenario 2—Curfew

Figure 3A:
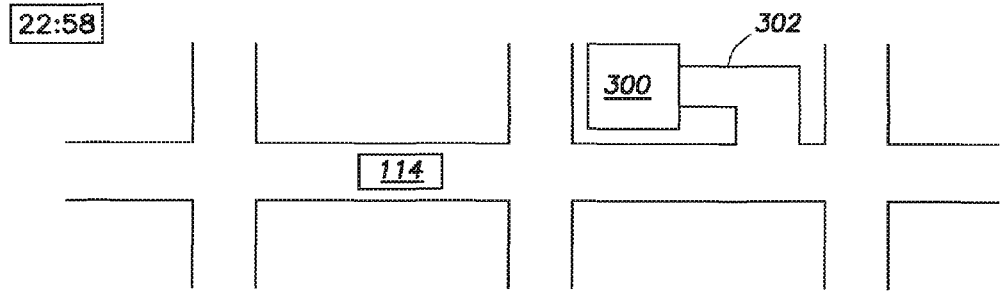
FIG. 3A shows an overhead view of a predetermined area with no geo-fence established in accordance with at least some embodiments.
Figure 3B:
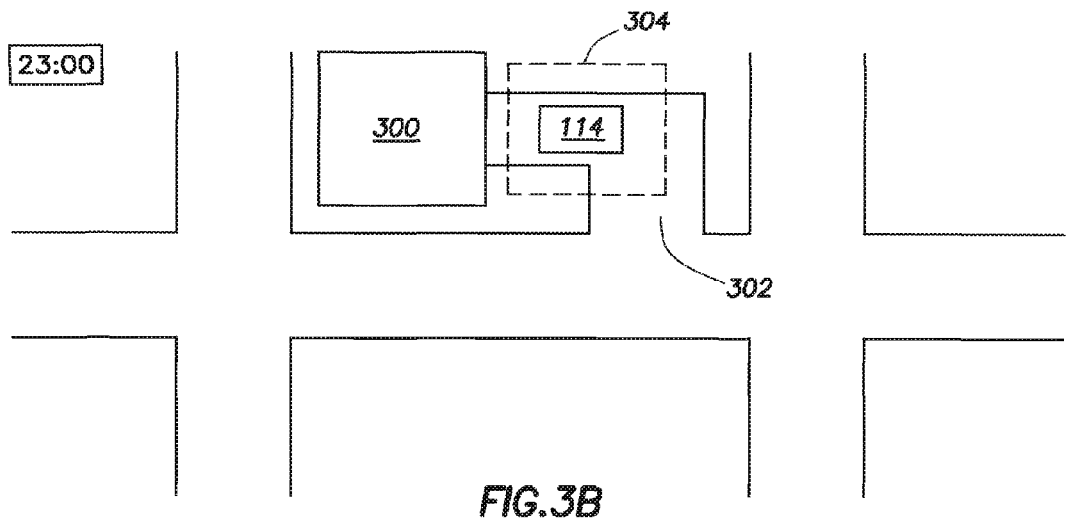
FIG. 3B shows an overhead view of an established geo-fence in accordance with at least some embodiments.
Figure 3C:
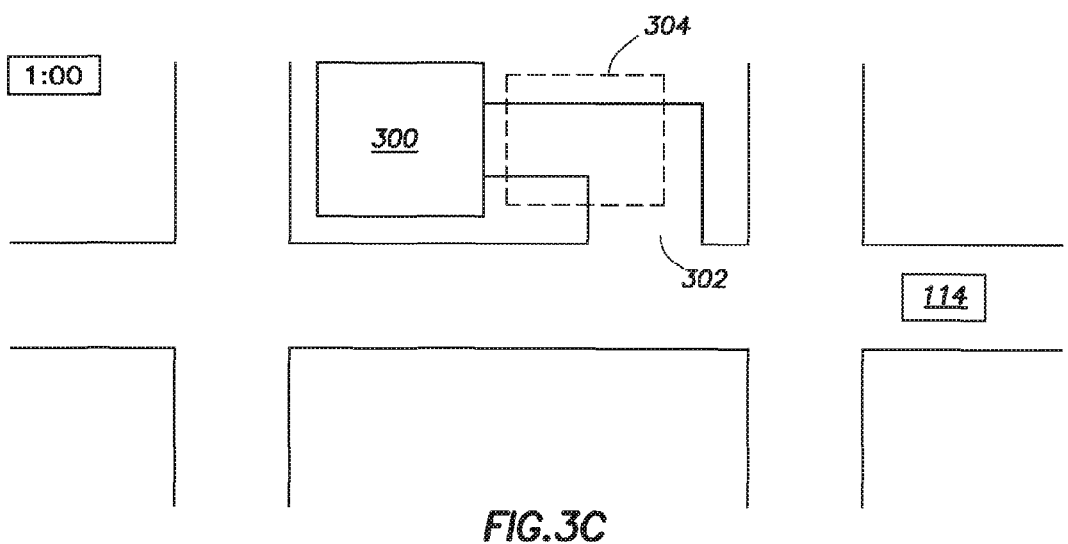
FIG. 3C shows an overhead view of an established geo-fence in accordance with at least some embodiments.

Now consider Scenario 2 as illustrated by FIGS. 3A-3C. FIG. 3A shows an overhead view of a portion of a neighborhood. In this example scenario, a teenager may have a nighttime curfew of 11:00 p.m., and thus must return to his house by that time. In particular, in FIG. 3A, a teenager is driving vehicle 114 at 10:58 p.m. He approaches his house 300. Because his curfew is 11:00 p.m., no geo-fence has yet been established.

In FIG. 3B, the vehicle 114 has pulled into the driveway 302 of house 300. At 11:00 p.m., the beginning time of the curfew in this example, the location of vehicle 114 is determined, and geo-fence 304 is automatically established around vehicle 114. Although not specifically shown, in this scenario, the curfew is in effect from the example hours of 11:00 p.m. until 6:00 a.m. Thus, once the geo-fence is established around the location of vehicle 114 at 11:00 p.m., the geo-fence is established at that location for the remainder of the curfew time period (i.e., until 6:00 a.m.).

In FIG. 3C, the teenager has driven the car outside of the established geo-fence 304 during the predetermined curfew time period at 1:00 a.m. The system detects that vehicle 114 has crossed out of the area bounded by geo-fence 304, and thus an alert is sent (e.g., to the teenager's parents) that curfew has been violated.

In yet another embodiment, the teenager may be spending the night at a friend's house. In this embodiment, the above situation applies similarly. In other words, the teenager drives to his friend's house and parks. Because the teenager's curfew is 11:00 p.m. regardless of where he is, the geo-fence is established around the location of his vehicle at 11:00 p.m. and will remain established until the preset duration expires. If the vehicle departs the established geo-fence before the time period has expired, the parents will receive an alert.

It should be noted that, in reference to this scenario, a determination may be made that the vehicle is not moving (e.g., parked) before a geo-fence is established. If the vehicle is in motion, in one embodiment, no geo-fence will be established and an alert will be automatically sent indicating the vehicle is in motion at the predetermined time. In another embodiment, a geo-fence may be established around the location of the vehicle at the predetermined time, wherever the vehicle may be located at that exact moment, regardless if the vehicle is in motion or not. Thus, if the teenager is still driving at 11:00 p.m., the geo-fence established at the location the vehicle was located at 11:00 p.m. In this case, an alert would immediately be sent since the vehicle is in motion, and thus traveling outside of the established geo-fence area.

While example Scenario 2 is discussed as a teenager violating a curfew, the scenario may apply to other situations. In another example situation, a police officer may drive his police vehicle home after his shift. However, because the police vehicle is only supposed to be used for official business, a geo-fence is established around the vehicle at the time it is presumed the officer is home and off-shift. If the officer drives his police vehicle outside of the geo-fence while off-duty, his supervisor may receive an alert regarding off-hour violations. The geo-fence remains established during the officers "off-duty" hours, and is automatically de-established when the officer's shift begins. In this example, the establishment of the geo-fence may take into account the time it would take the officer to drive to and from work and home.

In yet another scenario, a parolee may be able to use his vehicle during work hours, but similar to the police officer, may not drive the vehicle after work. Thus, a geo-fence may be established around the parolee's vehicle at a specific predetermined time (e.g., the time the parolee should be home), and is maintained as established during those hours when the parolee is not working. If the parolee drives the vehicle outside of the geo-fence during non-work hours, a parole office may receive an alert.

Scenario 2 is not limited to the examples described above, and may describe any situation in which the location of a vehicle is tracked, and a geo-fence is established around the location of the vehicle at a predetermined time. The geo-fence remains established for a predetermined duration, and an alert is sent to a third party if the vehicle crosses out of the established geo-fence.

Scenario 3

Figure 4A:
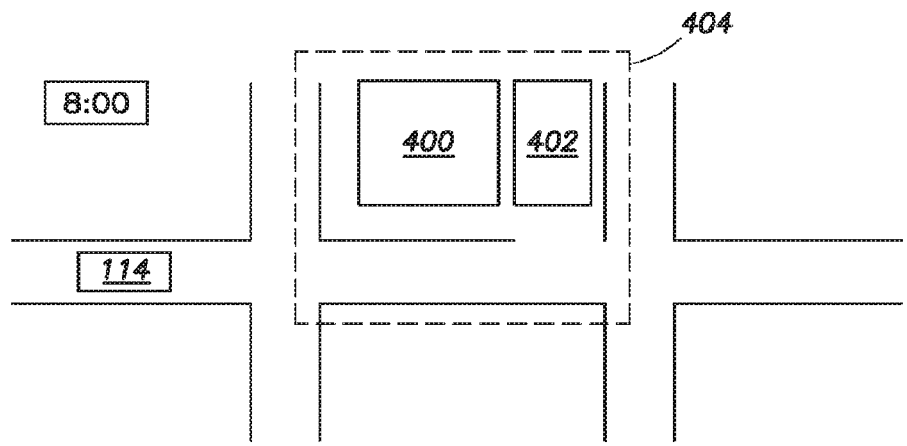
FIG. 4A shows an overhead view of an established geo-fence in accordance with at least some embodiments.
Figure 4B:
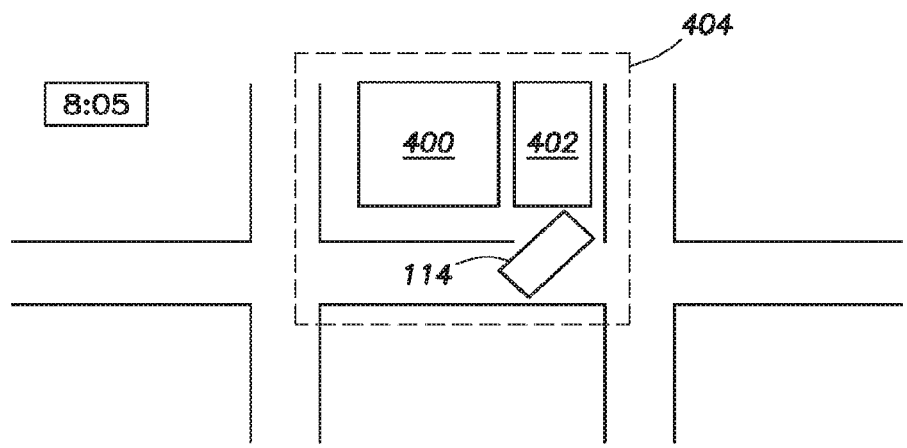
FIG. 4B shows an overhead view of an established geo-fence in accordance with at least some embodiments.
Figure 4C:
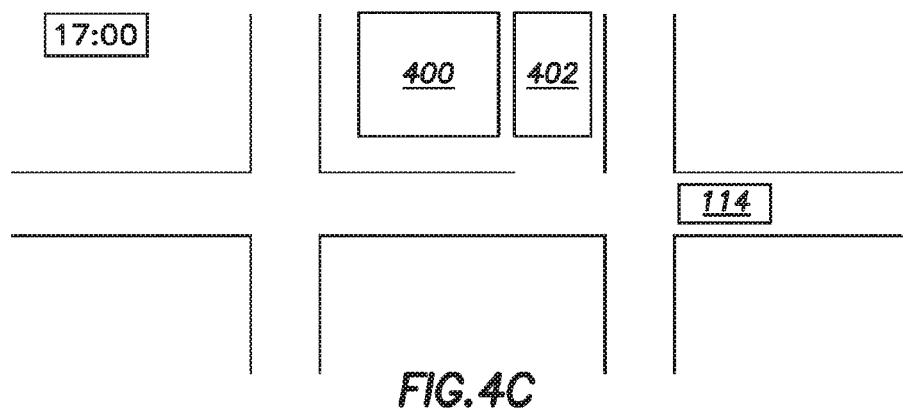
FIG. 4C shows an overhead view of a predetermined area with no geo-fence established in accordance with at least some embodiments.

Now consider Scenario 3 as illustrated by FIGS. 4A-4C. FIG. 4A shows an overhead view of a portion of a neighborhood. In this particular example, a high school 400 and a high school parking lot 402 are located within the neighborhood. The parents of a teenager attending school 400 may want to monitor whether or not he attends school when he is supposed to, and if so, whether he arrives on time and/or leaves early.

Thus, the parents may configure the geo-fence for a predetermined location, to be automatically established at a predetermined time and for a predetermined duration, to be repeated indefinitely until the configuration of the geo-fence has been changed.

In one embodiment, a geo-fence 404 is automatically established around the school 400 and the parking lot 402 at a predetermined time. In the example shown in FIG. 4A, the geo-fence 404 is automatically established at 8:00 a.m. The system determines whether the vehicle 114 is located within the geo-fence 404 at the time of establishing. In the case of FIG. 4A, vehicle 114 is located outside of the geo-fence at 8:00 a.m. In this example, the vehicle is not located where it is supposed to be; in other words, the vehicle is not located at school at the predetermined time of 8:00 a.m. Thus, an alert is sent to the parents indicating the vehicle is not located at school.

Scenario 4

Scenario 4 occurs after the geo-fence 404 has been established, as shown in FIG. 4B. For example, five minutes after the geo-fence 404 has been established, vehicle 114 enters the geo-fenced area at 8:05 a.m. and pulls into the parking lot 402. The location of the vehicle is now determined to be located within the established geo-fence area, and the parents are sent an alert indication the vehicle has arrived late to school.

After the predetermined time period has expired, the geo-fence is no longer established. As shown in FIG. 4C, at 5:00 p.m., the geo-fence is no longer established, and thus vehicle 114 may travel anywhere in the neighborhood vicinity without an alert being sent to the parents.

Scenario 5

Figure 5A:
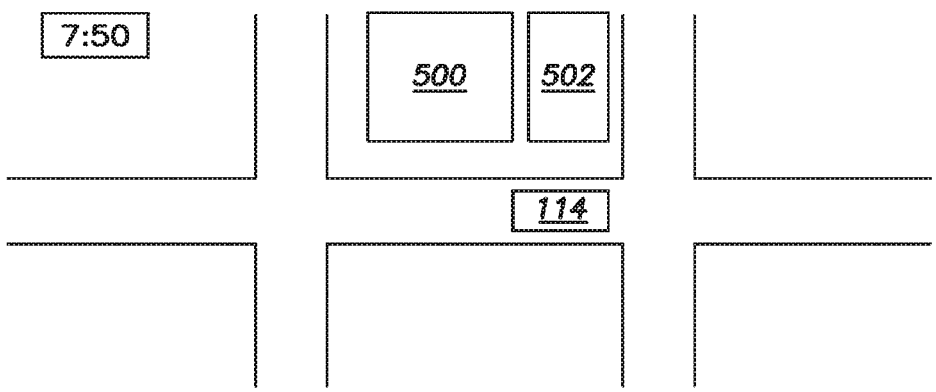
FIG. 5A shows an overhead view of a predetermined area with no geo-fence established in accordance with at least some embodiments.
Figure 5B:
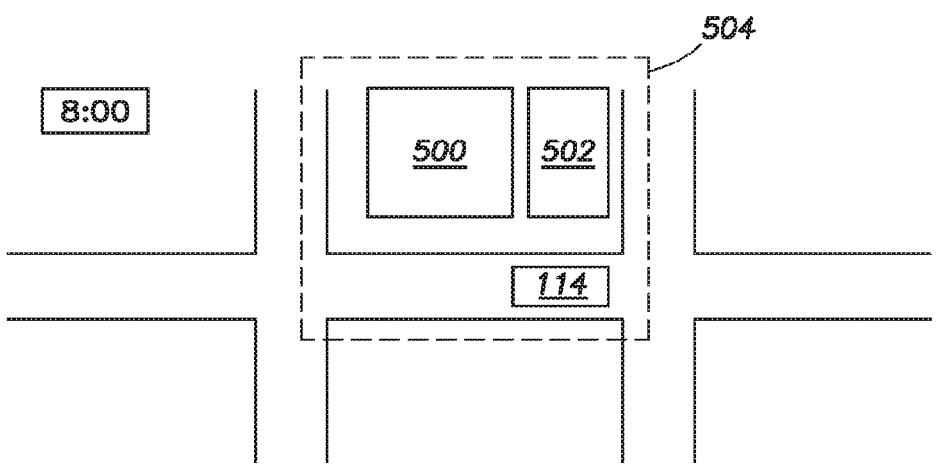
FIG. 5B shows an overhead view of an established geo-fence in accordance with at least some embodiments.

Turning now to FIG. 5A, the same school 400 and parking lot 402 from FIGS. 4A-4C are shown. In Scenario 5, however, vehicle 114 is located at the school grounds 10 minutes before the predetermined establishing time (i.e., 8:00 a.m.) of the geo-fence 404. Subsequently, in FIG. 5B, at example time 8:00 a.m. the geo-fence 404 is established around the school 400 and the parking lot 402. In this example, the vehicle 114 is already within the area bounded by the geo-fence at the time of activation. In one embodiment, an alert may be sent to the parents at the time of establishment which indicates vehicle 114 is already at school. In another embodiment, because vehicle 114 is located at the desired location, no alert may be sent.

Figure 5C:
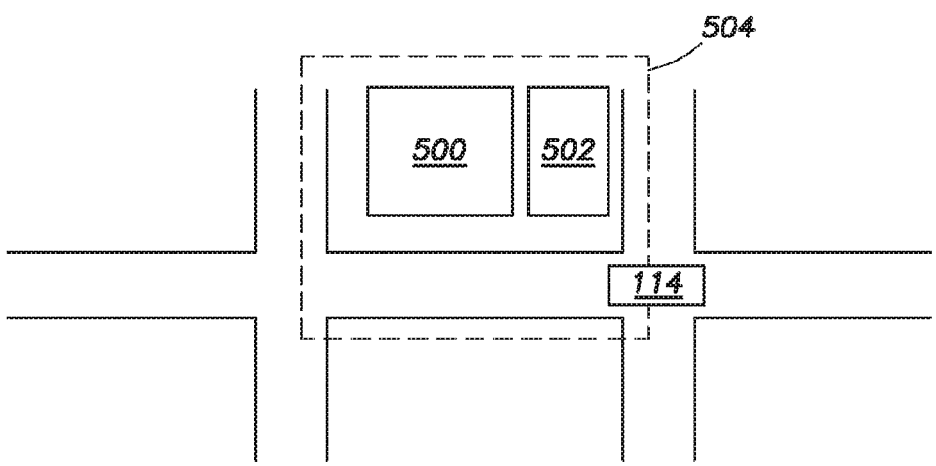
FIG. 5C shows an overhead view of an established geo-fence in accordance with at least some embodiments.

If at any point during the duration of time when geo-fence 404 is established, vehicle 114 departs the area bounded by the geo-fence, such as depicted in FIG. 5C, an alert will be sent to the parents indicating the vehicle has left school grounds during school hours.

Regardless if the vehicle enters the geo-fenced area after the establishment of the geo-fence, or if the vehicle was present at the location bounded by the geo-fence at the time the geo-fence is established, an alert will be sent if the vehicle departs the area bounded by the geo-fence anytime during the established duration.

Although the above scenarios have mainly discussed a teenage driver and alerts being sent to his or her parents, the system and methods described may apply to other situations with other drivers and other third parties. For example, a delivery employee may be monitored by his employer during the course of his work shift. If the employee exits the geo-fence established around his delivery area which has been established for the duration of his work shift, the employer may get an alert that the employee is using the company vehicle for a purpose other than work.

In another example scenario, geo-fences may be established around specific delivery locations, wherein the employer is alerted when the employee enters the location encompassed by the geo-fence. After delivery hours, the employer is not concerned about those locations, and thus the geo-fences will not be established and the location of the vehicle is not monitored.

Any number of situations in which the location of a driver is to be monitored in relation to a durational geo-fence may be contemplated.

Figure 6:
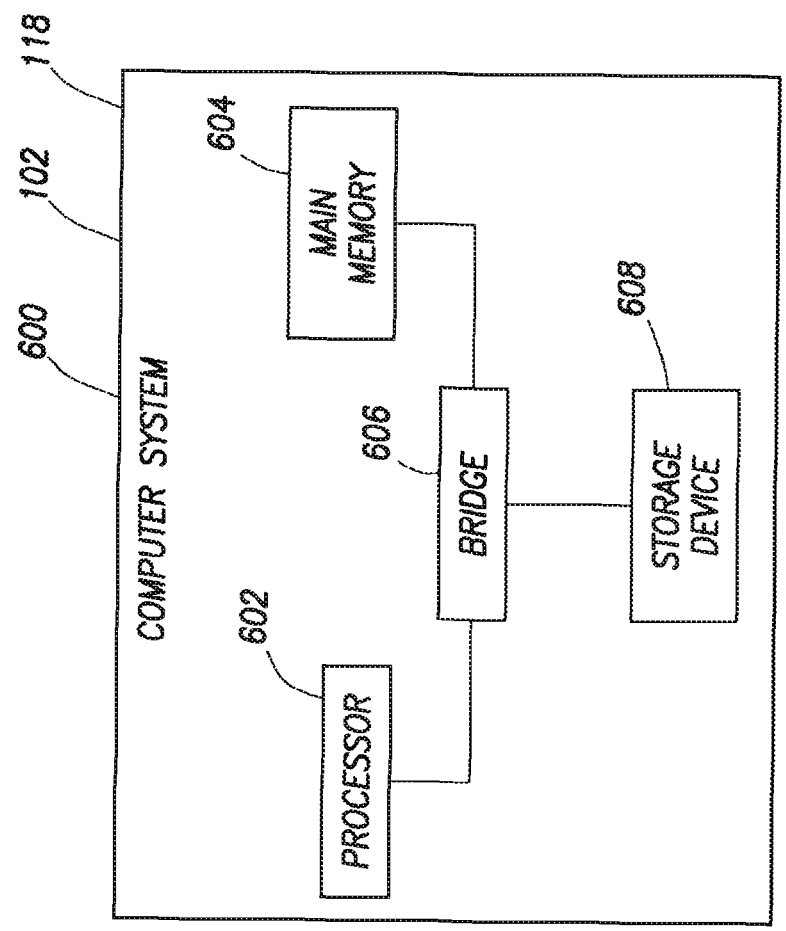
FIG. 6 shows a computer system in accordance with at least some embodiments.

FIG. 6 shows a computer system 600, which is illustrative of a computer system upon which the various embodiments may be practiced. The computer system 600 may be illustrative of, for example, computer system 118 coupled to the onboard device 116. In yet another embodiment, computer system 600 may be illustrative of computer system 102. In particular, computer system 600 comprises a processor 602, and the processor couples to a main memory 604 by way of a bridge device 606. Moreover, the processor 602 may couple to a long term storage device 608 (e.g., a hard drive, solid state disk, memory stick, optical disc) by way of the bridge device 606. Programs executable by the processor 602 may be stored on the storage device 608, and accessed when needed by the processor 602. The program stored on the storage device 608 may comprise programs to implement the various embodiments of the present specification, such as sending an indication of the last known location of vehicle 114 in the event of monitoring with relation to a curfew geo-fence. In some cases, the programs are copied from the storage device 608 to the main memory 604, and the programs are executed from the main memory 604. Thus, the main memory 604, and storage device 608 shall be considered computer-readable storage mediums.

Figure 7:
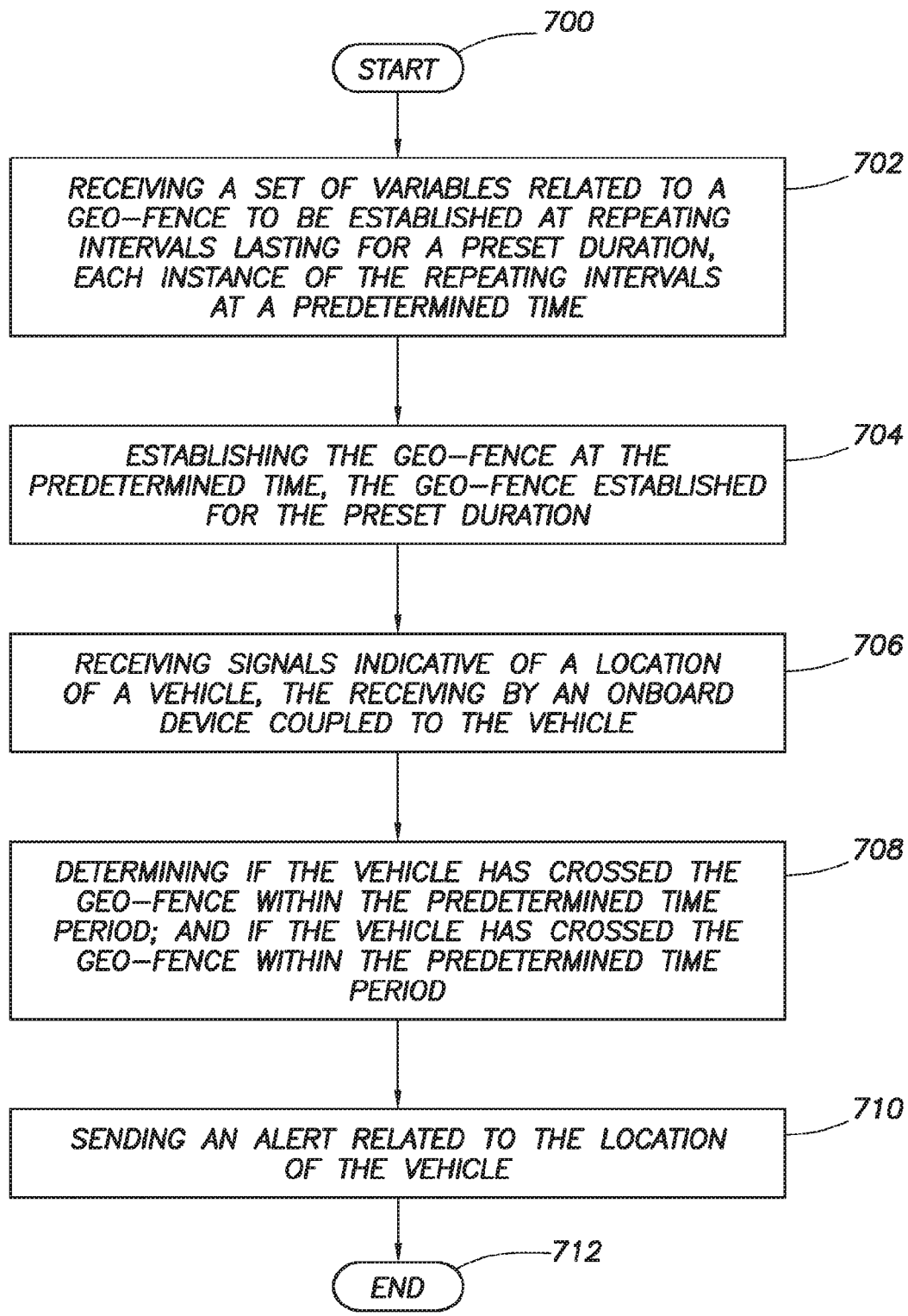
FIG. 7 shows, in block diagram form, a method in accordance with at least some embodiments.

The method of establishing a geo-fence at a predetermined time and for the duration of a preset duration is discussed with respect to FIG. 7. FIG. 7 shows, in flow diagram form, a method in accordance with some embodiments. In particular, the method starts (block 700). A geofence is established at a predetermined time, and the geofence is established for a duration of a preset duration (block 702). Signals are received indicative of a location of a vehicle, the receiving by an onboard device coupled to the vehicle (block 704). The method moves to determining if the vehicle has crossed the geo-fence within the preset duration (block 706) and if the vehicle has crossed the geo-fence within the preset duration and alert is sent related to the location of the vehicle (block 708). Thereafter, the method ends (710).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, the various embodiments have been described in terms of sending alerts related to a vehicle's location relative to an established geo-fence. This context, however, shall not be read as a limitation as to the scope of one or more of the embodiments described—the same techniques may be used for other embodiments. It is intended that the following claims be interpreted to embrace all such variations and modifications.

We claim:

1. A system comprising:
    a processor;
    a wireless interface coupled to the processor;
    a memory coupled to the processor, the memory storing a program that, when executed by the processor, causes the processor to:
    receive a set of variables related to a geo-fence to be established at a predetermined time for a preset duration; establish the geo-fence at the predetermined time, the geo-fence established for the preset duration;
    monitor a location of a vehicle using signals received by the processor; and
    send an alert related to the location of the vehicle if said monitoring indicates the vehicle has crossed the geo-fence within the preset duration.

2. The system of claim 1 wherein when the program establishes, the program further causes the processor to establish the geo-fence around the location of the vehicle.

3. The system of claim 1 wherein when the program monitors the location of the vehicle, the program further causes the processor to determine the vehicle has crossed out of an area bounded by the geo-fence.

4. The system of claim 1 wherein when the program monitors the location of the vehicle, the program further causes the processor to determine the vehicle has crossed into an area bounded by the geo-fence.

5. The system of claim 1 wherein the program further causes the processor to:
    determine the vehicle was located within an area bounded by the geo-fence at a time the geo-fence was established; and then
    wherein when the program monitors the location of the vehicle, the program further causes the processor to determine the vehicle has crossed out of the area bounded by the geo-fence.

6. The system of claim 1 wherein the program further causes the processor to:
    determine the vehicle was located outside of an area bounded by the geo-fence at a time the geo-fence was established; and then
    wherein when the program monitors the location of the vehicle, the program further causes the processor to determine the vehicle has crossed into the area bounded by the geo-fence.

7. The system of claim 1 wherein when the processor establishes, the program further causes the processor to establish the geo-fence for at least one selected from the group consisting of: a restricted area; and an allowed area.

8. The system of claim 1 wherein the preset duration is at least one selected from the group consisting of: a window of time; work hours; school hours; and restricted hours.

9. The system of claim 1 wherein when the processor sends the alert, the program further causes the processor to send an alert to at least one selected from the group consisting of: a parent; a law enforcement officer; a vehicle owner; and an employer.

10. A system comprising:
    an onboard device, the onboard device comprising:
        a processor;
        a Global Positioning System receiver coupled to the processor;
        a wireless interface coupled to the processor;
        a memory coupled to the processor, the memory storing a program that, when executed by the processor, causes the processor to:
            receive a set of variables related to a geo-fence to be established at a predetermined time for a preset duration;
            establish the geo-fence at the predetermined time, the geo-fence established for the preset duration;
            monitor a location of a vehicle using signals received by the processor; and
            send an alert related to the location of the vehicle if said monitoring indicates the vehicle has crossed the geo-fence within the preset duration.

11. The system of claim 10 wherein when the program establishes, the program further causes the processor to establish the geo-fence around the location of the vehicle.

12. The system of claim 10 wherein when the program monitors the location of the vehicle, the program further causes the processor to determine the vehicle has crossed out of an area bounded by the geo-fence.

13. The system of claim 10 wherein when the program monitors the location of the vehicle, the program further causes the processor to determine the vehicle has crossed into an area bounded by the geo-fence.

14. The system of claim 10 wherein the program further causes the processor to:
    determine the vehicle was located within an area bounded by the geo-fence at a time the geo-fence was established; and then wherein when the program monitors the location of the vehicle, the program further causes the processor to determine the vehicle has crossed out of the area bounded by the geo-fence.

15. The system of claim 10 wherein the program further causes the processor to:
   determine the vehicle was located outside of an area bounded by the geo-fence at a time the geo-fence was established; and then
   wherein when the program monitors the location of the vehicle, the program further causes the processor to determine the vehicle has crossed into the area bounded by the geo-fence.

16. The system of claim 10 wherein when the processor establishes, the program further causes the processor to establish the geo-fence for at least one selected from the group consisting of: a restricted area; and an allowed area.

17. The system of claim 10 wherein the preset duration is at least one selected from the group consisting of: a window of time; work hours; school hours; and restricted hours.

18. The system of claim 10 wherein when the processor sends the alert, the program further causes the processor to send an alert to at least one selected from the group consisting of: a parent; a law enforcement officer; a vehicle owner; and an employer.

* * * * *